United States Patent
Liu et al.

(10) Patent No.: US 7,647,370 B1
(45) Date of Patent: Jan. 12, 2010

(54) SCREEN SCRAPING INTERFACE

(75) Inventors: Youzhong Liu, Flower Mound, TX (US); Tao Pan, Flower Mound, TX (US); Kaushhik Pillalamarri, Irving, TX (US); Khaldoun Sabagh, Frisco, TX (US); Fariborz Ebrahimi, Rockville, MD (US)

(73) Assignee: Verizon Data Services LLC, Temple Terrace, FL (US)

( * ) Notice: Subject to any disclaimer, the term of this patent is extended or adjusted under 35 U.S.C. 154(b) by 1176 days.

(21) Appl. No.: 10/693,706

(22) Filed: Oct. 24, 2003

(51) Int. Cl.
*G06F 15/16* (2006.01)
(52) U.S. Cl. .................... 709/203; 709/219; 709/226; 709/227
(58) Field of Classification Search ............... 709/203, 709/219, 226, 227
See application file for complete search history.

(56) References Cited

U.S. PATENT DOCUMENTS

| | | | |
|---|---|---|---|
| 5,564,040 A * | 10/1996 | Kubala | 711/173 |
| 6,523,027 B1 * | 2/2003 | Underwood | 707/4 |
| 6,981,257 B2 * | 12/2005 | Teubner | 718/101 |
| 6,996,615 B1 * | 2/2006 | McGuire | 709/226 |
| 7,016,877 B1 * | 3/2006 | Steele et al. | 705/50 |
| 7,028,093 B2 * | 4/2006 | Jaenecke et al. | 709/230 |
| 2003/0208563 A1 * | 11/2003 | Acree et al. | 709/219 |
| 2003/0231750 A1 * | 12/2003 | Janveja et al. | 379/114.03 |
| 2005/0086664 A1 * | 4/2005 | Sundaresan et al. | 719/312 |

OTHER PUBLICATIONS

Youzhong Liu et al., A Gateway for Host Connectivity, Proc of IADIS Intl. Conf. WWW/Internet, Lisbon, Portogal, pp. 315-324, Nov. 2002.
Youzhong, Liu et al., Backend Integration Gateway, Accepted for Publication by IADIS Journal.

* cited by examiner

*Primary Examiner*—Salad Abdullahi
*Assistant Examiner*—El Hadji M Sall

(57) ABSTRACT

An interface can serve as a client-mainframe interface, enabling clients to develop applications without a need to understand mainframe processes and screen flows. Extended Tool Command Language (Tcl) can define services that can include a series of interactions with a mainframe system and service definitions can be added or updated on the interface during operation of the interface without disrupting processing. The service definitions can enable the interface to receive XML requests from a client, parse the XML requests, execute the service scripts to interact with the mainframe systems, generate the result in a XML format and send the XML file back to the client. Fundamental Mainframe Interactions (FMI) commands can interact with the mainframe systems and enable the specification of the XML structure of the request and response. The interface can provide efficient connection pooling management and connection life cycle control to improve the performance of the mainframe system interactions.

21 Claims, 4 Drawing Sheets

SCREEN SCRAPING INTERFACE

FIELD OF THE INVENTION

The systems and methods relate to mainframe interfaces, and more particularly to an interface for providing transparent communication with a mainframe system.

BACKGROUND

In the current business environment, it can be advantageous for a company to have a web presence. However, a gap can exist between e-commerce infrastructures and legacy mainframe systems that can present numerous challenges. Due to this gap, online business transactions cannot flow through, or be executed in the mainframe system in real time. For example, common and convenient e-commerce transactions can include paying bills online. Unfortunately, only a small portion of online payments can flow through mainframe systems, even in today's "high-tech" era. It can take three to seven days for the payment to be effective as the online transactions can be queued in a database for manual entry into a legacy or mainframe billing system.

Enterprises, such as telecommunication industries, can have many critical mainframe systems that can run operations for ordering, provisioning, repair, dispatch, and billing activities. In many instances, the users interfacing with the mainframe system can be production workers of the enterprises, e.g., call center representatives, help desk support personnel, dispatch technicians, and the like. In such instances, prolonged user-system interaction can harm productivity. To remain competitive, enterprises can require means to integrate their e-commerce infrastructure with legacy or mainframe systems so as to provide customers/users with a substantial real-time experience and improved usability. In addition, integrating the legacy systems with the e-commerce infrastructure can provide a consolidated tool that can improve productivity and efficiency for production workers and result in cost reductions and increased customer satisfaction.

However, replacing legacy systems to satisfy the needs of the customers and the production workers can be unrealistic. These legacy applications can be very secure, highly reliable and can handle large volumes of data, making them the preferred choice of large enterprises. Enterprises can be reluctant to change their stable applications because they risk significant revenue loss if the replacement applications fail. Interfaces to mainframe systems can be built using stored procedures or other mainframe development tools. While this may not involve change to existing mainframe applications, it can require fully understanding and programming the complicated business logic in mainframe applications in different ways, which can take an extended period of time. However, there remains a need for businesses to integrate web applications with mainframe systems.

Screen scrapers and Web terminal emulators that can enable consolidation of the legacy systems as well as provide a Web interface to these systems can be a suitable solution. Screen scraping, also known as screen-based navigation or screen-based data capture, can read the data stream intended for a mainframe terminal, either via a client based terminal emulator or a server based program, and can turn the data stream into a graphical presentation compatible with what users expect from modern desktop applications. In so doing, screen scraping can avoid making changes to the mainframe application while making it easier to use. Screen scraping can also enable fairly extensive modifications to the sequence of information presented to the user by combining several screens into a single graphical presentation, giving the effect of modifying the application without affecting the business logic.

Recent developments have resulted in major changes in the field of uniting Web and legacy technologies. Web interface to legacy systems can provide users with a substantial real-time experience as well as extend the scope of the mainframe application to a larger user base. Commercially available products can render the terminal-oriented presentation of an application on a Web browser without modifying the application. These tools can be easy to use and implement, but can have several drawbacks. They can be limited in terms of scalability, flexibility, functionality, and security. They can be suitable only for simple transactions and activities and the user interface may not be friendly.

Known screen scraper tools can provide underlying Application Programming Interfaces (APIs) for screen scraping. However, e-commerce programmers can still be required to understand the business logic of the mainframe applications to build the interface to the mainframe system. Therefore, there can be a need to develop middleware that can provide a transparent interface to mainframe systems for clients and that can address the drawbacks of existing screen scrapers and Web terminal emulators. Additionally, there can be a need for middleware that can be used to interface with a variety of mainframe systems and can allow users to add or change the interface to a mainframe system without disrupting processing.

SUMMARY OF THE INVENTION

An interface can serve as the middleware, or communication link between a client and a mainframe system. The interface can accept XML requests from the clients, can communicate with mainframe systems, and can return XML results to the clients. By providing a transparent interface, the client programmers can develop the client applications without a need to understand the mainframe processes and screen flows. A service can include a series of interactions with a mainframe system, e.g., a service for paying a bill online can include several mainframe screen interactions. Tool Command Language (Tcl) can be extended to define a service and service definitions can be added or updated to the interface during operation of the interface without disrupting processing. The basic commands for interacting with the mainframe systems can include Fundamental Mainframe Interactions (FMI) commands. FMI commands can enable the specification of the XML structure of the request and response. FMI commands can be invoked from a service directly. At runtime, upon receiving a request from a client, the interface can parse the XML request, can execute the service scripts to interact with the mainframe systems, can generate the result in a XML format, and can send the XML file back to the client. The interface can provide efficient connection pooling management and connection life cycle control to improve the performance of the mainframe interactions.

In one embodiment, a interface for interfacing a client with a mainframe system can include a session manager receiving requests for services from the client, a message processor to parse the requests to obtain parsed requests, a service processor to obtain service definitions based on the parsed requests and a host connector interacting with the mainframe system and executing commands based on the service definitions, the commands corresponding with applications recognized by the mainframe system for providing results to the requests for services from the client. The interface can include a database for storing a plurality of service definitions and a storage manager that can communicate with the service processor and retrieve the service definitions based on the parsed requests from the database.

In one aspect, the interface can include an interface engine to listen for a connection request from the client and instantiate the session manager to receive the requests for services related to the connection request. The interface engine can assign one of a plurality of pre-established connections from a connection pool to the client in response to the connection request. The interface engine can instantiate the session manager from pre-established session managers in a thread pool. The interface can include a cache memory and a service cache to store in the cache memory, the service definitions for the requests for services related to the connection.

In one aspect, the interface can include an administrative tool for creating new service definitions and/or modifying existing service definitions. The administrative tool can include a socket connection to communicate administrative requests to the interface. The interface can include a command processor that can execute administrative commands based on the requests for services being requests for a single command. The interface can further include an authenticator containing access privilege information for the client that can be used in determining if the client is authorized to have the service processor obtain the service definitions. The interface can also include a logging service to log activities of the interface.

In one embodiment, a method of interfacing a client with a mainframe system can include receiving requests for services from the client, parsing the requests to obtain parsed requests, obtaining service definitions based on the parsed requests, interacting with the mainframe system, executing commands based on the service definitions, the commands corresponding with applications recognized by the mainframe system for providing results to the requests for services from the client, and providing the results to the client. The method can receive a connection request from the client and instantiate a session manager to receive the requests for services.

In one aspect, the method can pre-establish a plurality of session managers and instantiate one of the session managers. The method can retrieve entitlement information related to the client and obtain service definitions when the entitlement information indicates the parsed requests can be processed for the client. The method can return an error message to the client when the entitlement information indicates the parsed requests cannot be processed for the client. In one aspect the method can determine if the requests for services are single commands and execute the single commands at an interface interfacing the client with the mainframe system.

In one aspect, the method can create a plurality of connections with the mainframe system to form a connection pool and connections can be assigned from the connection pool when a service request is received. The method can return the connection to the connection pool when the client chooses to end a session with the mainframe system. When creating the connections, the method can perform commands corresponding to startup sections of the service definitions. The method can perform commands corresponding to execution sections of the service definitions when executing the commands.

In one aspect, the method can perform commands corresponding to a closeup section of the service definition so as to release the plurality of connections when the requests for services include a logout request. In one aspect, the method can include specifying identifiers for mainframe screens and specifying actions to be taken with respect to the mainframe screens to generate the service definitions, the actions including receiving the requests for services and providing the results.

In one aspect, the method can include opening a socket connection to an interface to facilitate interfacing with the mainframe system and managing the interface over the socket connection. Managing can include controlling access of the clients to the interface, generating the service definitions, and/or modifying the service definitions. Managing can also include logging activities of the interface to obtain logs and debugging the execution of the commands based on the logs.

In one embodiment, computer-readable medium can contain instructions for controlling a computer to perform screen-based navigation for interfacing a client with a mainframe system. The instructions can include controlling a computer to define at least one service in a string based command language, including at least one mainframe screen interaction, to receive eXtensible Markup Language (XML) requests from the client, to parse the requests into string based command language requests, to determine the service corresponding to the string based command language requests and obtain service script corresponding to the service, to establish a connection to the mainframe system, to execute the service script on the mainframe system so, as to perform the mainframe screen interaction corresponding with the service, to generate results for the mainframe screen interaction in XML format, and to present the results to the client.

The instructions can control the computer to create a plurality of connections to form a connection pool when defining the service, and to assign one of the connections from the connection pool so as to establish the connection to the mainframe system. The instructions can control the computer to separate the service into a startup section, an execution section, and a closeup section when defining the service. The instructions can control the computer to execute the startup section when creating the plurality of connections, to execute the execution section when executing the service script on the mainframe system, to return the connection to the connection pool when receiving an XML request to end a session, and to execute the closeup section to release the plurality of connections when receiving an XML request to logout from the mainframe system.

BRIEF DESCRIPTION OF THE DRAWINGS

The following figures depict certain illustrative embodiments in which like reference numerals refer to like elements. These depicted embodiments are to be understood as illustrative and not as limiting in any way.

DETAILED DESCRIPTION OF THE PREFERRED EMBODIMENTS

Figure 1:
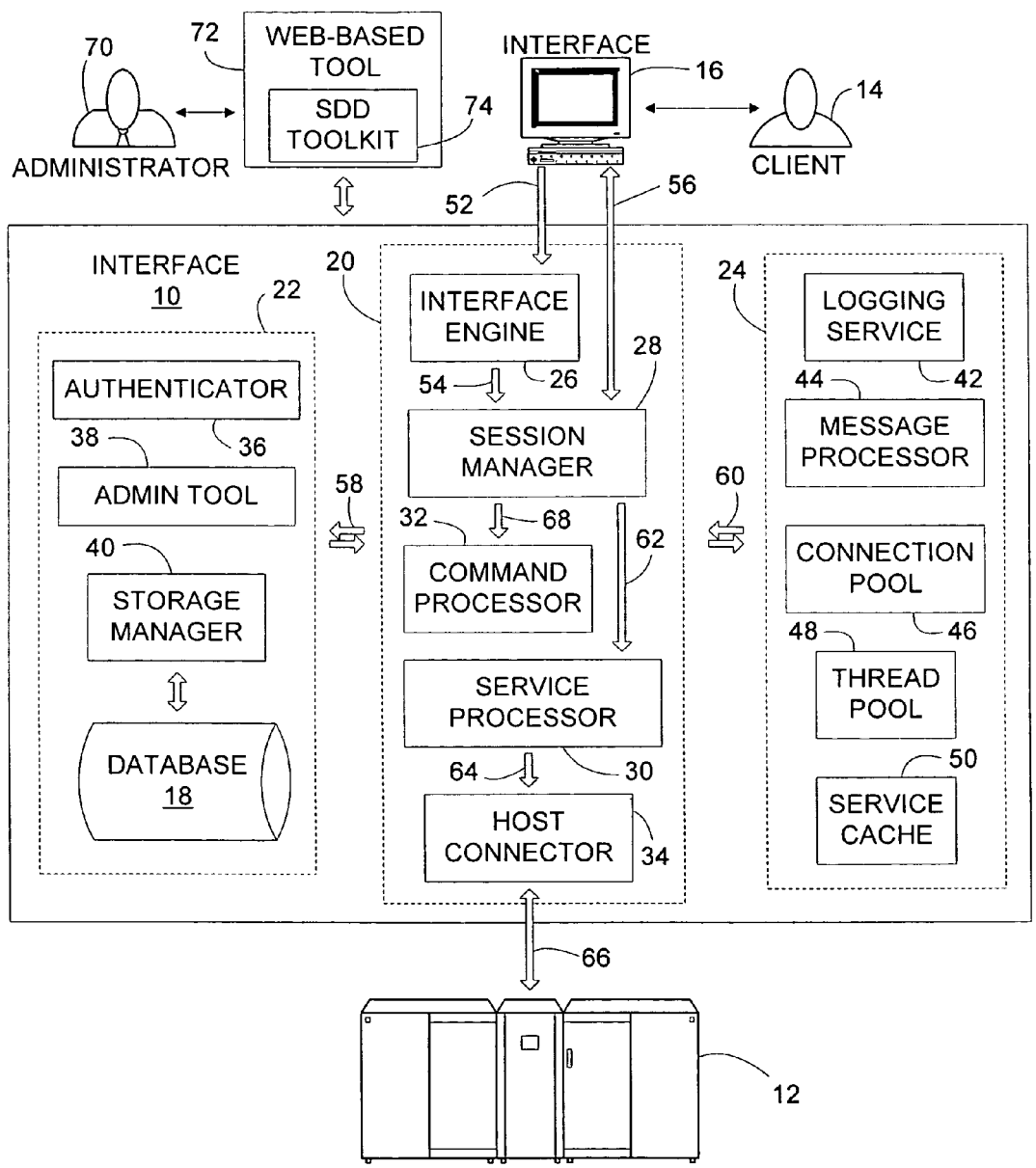
FIG. 1 illustrates a block diagram of an interface for providing a transparent interface to a mainframe system.

Referring to FIG. 1, there is shown an exemplary backend integration interface 10 that can serve as middleware to provide an interface between a client 14 and a mainframe system 12. In one embodiment, interface 10 can accept XML requests from client 14, communicate such requests to the mainframe system 12, and communicate results of such requests to the client 14 using XML. By providing such a transparent interface, the client 14, and/or users of the client 14 do not need knowledge of the mainframe system 12 processes and screen flows to develop the client applications that can input and receive data to/from the mainframe system 12.

A series of interactions with a mainframe system can be referred to herein as a service. For example, paying a bill online can include several mainframe screen interactions. A service for online bill payment can encapsulate these interactions. As commonly known by those of skill in the art, Tool Command Language (Tcl) can be implemented as a string based command language and can be easily extended to support new commands. Thus, for example, Tcl can be extended to support new commands in the scripts used to define services, referred to as Service Definitions. In one embodiment, commands to interact with the mainframe system 12 can be referred to herein as Fundamental Mainframe Interactions (FMI) commands. A Tcl extension can be implemented to support FMI commands. Consequently, FMI commands can be used in Tcl scripts directly in the known manner of using commands in Tcl. Definitions for the services can be added or updated on interface 10 during operation of interface 10 without disrupting processing. FMI commands can also enable the specification of an XML structure of the request and response. FMI commands can be invoked from a service.

Upon receiving a request from client 14, interface 10 can parse the XML request, execute the service scripts to interact with mainframe system 12 using known Java command language (JACL), generate the result in XML format, and send the XML file to client 14. (Java is a trademark of Sun Microsystems, Inc.) Interface 10 can provide connection pooling management and connection life cycle control to improve the performance of mainframe interactions. Client 14 can input and receive data via interface 16, which can include a Graphical User Interface (GUI) for communicating with interface 10, which in turn interfaces with mainframe system 12. The interface for client 14 can include web browsers, Visual Basic applications users, cellular and landline phone users, and users of other means for communicating with a processing system.

FMI commands can be classified into three categories. A retrieval category can include commands for retrieving information from a particular position on a screen of mainframe system 12, and determining whether a specific pattern is available on the mainframe screen. An update category can include commands for entering data into fields on the mainframe screen, and invoking function keys to navigate through different mainframe screens. A control category can include commands for identifying the current cursor position on the mainframe screen, moving the cursor to a specified position, reading input XML, creating XML output hierarchy structure, and making and closing connections. Table 1 can include exemplary FMI commands for the above categories. It can be understood that FMI commands in addition to those of Table 1 can be provided for interactions with mainframe system 12.

TABLE 1

Fundamental Mainframe Interactions (FMI)

| Category | Command Name | Command Description | Parameters |
|---|---|---|---|
| Retrieval | wait_for_msg | Wait for a particular message pattern on the screen. If the pattern is found for the given time period, return true, false otherwise. | Pattern: the message to search<br>Position: the position on the screen to begin the search<br>Exact: a flag to indicate if the position is the exact position to begin the search or any position beyond<br>Time interval: the time interval to perform a check |
| | retrieve_screen | Retrieve content from the screen starting from a given position with a given length and create an appropriate XML tag in the result XML string. The retrieved content is returned by this command. | Position: the position to begin the retrieval<br>Length: the total length of the content<br>Tag: the tag name in the output XML string. If tag name is not specified, the retrieved content is not added to the result XML string |
| | Output | Appends content to the result XML string | Text: the content to be output<br>Tag: the tag name in the output XML file |
| Update | send_key | Send keystrokes to the mainframe system. This may result in placing text at the current position on the screen or invoking function keys. | Keys: the keys to be sent |

TABLE 1-continued

Fundamental Mainframe Interactions (FMI)

| Category | Command Name | Command Description | Parameters |
|---|---|---|---|
| Control | get_cursor | Get the current cursor position on the screen. | None |
|  | set_cursor | Set the cursor to the given position on the screen. | Position: position to be set on the screen |
|  | open_output_item | Create a new tag in the result XML string. The new tag will be a child of the current tag. | Tag: the tag name in the result XML string |
|  | close_output_item | Close the closest open tag. | Tag: the tag name to be closed |
|  | open_input_item | Make the element with the given name (which is a child of the current working element) as the working element. | Tag: the element name in the input XML string |
|  | close_input_item | Close the closest open element of the input XML string. | Tag: the element name to be closed |
|  | get_parameter | Get a parameter from the current element in the input XML | Tag: the parameter name |
|  | get_service_parameter | Get the value of the service parameter from the database. | Name: the parameter name |
|  | Connect | Connect to a mainframe system | Server: the mainframe system name |
|  | Close | Close the connection | None |

The position parameter for such commands wait_for_msg, retrieve_screen, and set_cursor, as described in Table 1 can be an absolute position or can be represented using X and Y coordinates. Generally, mainframe system screens can include 80 columns and 24 rows. The absolute position for a co-ordinate denoted by (x, y) can be calculated using the formula 80*(x−1)+(y−1). For example, a position at column 6, line 10 (6, 10) can have an absolute portion of 80 (6−1)+(10−1)=409.

A scenario can be described that can exemplify the writing of a service definition to capture the screen flow and business logic for a service. The scenario can include a service to retrieve time reporting information of a company employee from mainframe system 12. While interface 10 and its implementation can be described herein by use of this scenario, it can be understood that interface 10 and its implementation can support various scenarios for interfacing with mainframe system 12.

Figure 2:
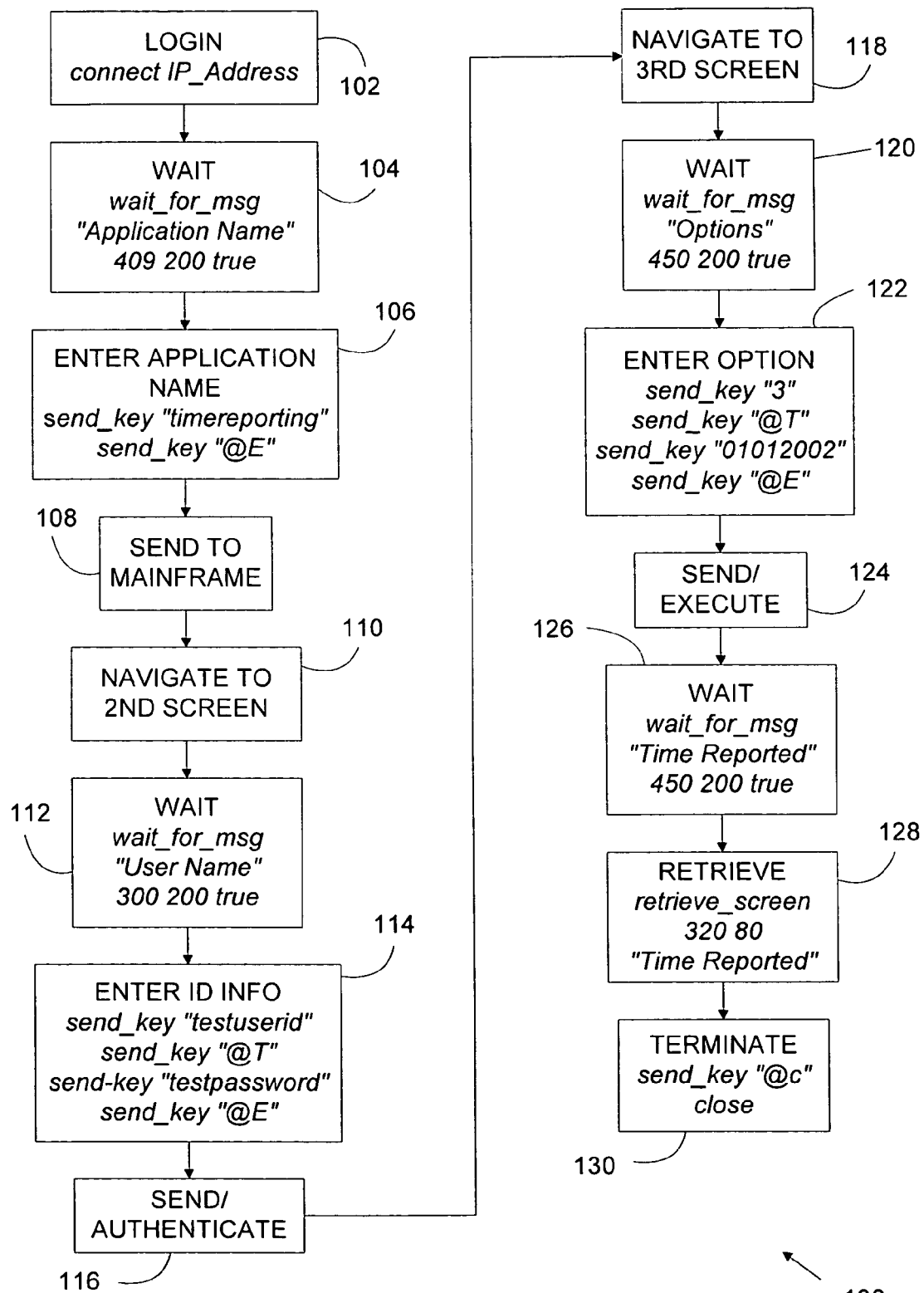
FIG. 2 illustrates a flow chart of a service definition for communication with a mainframe system.

In one embodiment, an employee can use terminal emulation to connect to the time reporting system from a PC to view the time reported for a specified week, e.g., by providing the beginning date of the week. FIG. 2 provides a flow diagram for a service definition 100 to accomplish this task, including FMI commands from Table 1. In general, once logged in, the employee can be prompted to input the application name, as there can be a number of applications hosted by the server. The employee can enter the application name and can then be prompted to enter an employee ID and password. After entering the ID and password, the system can display a menu of options, e.g., add, edit and view, prompting the employee to select an option. The employee can select the option by entering the option number from the main menu. For the exemplary scenario, a view option can be selected and the beginning date of the week can be provided. The system can then display the time reported for the selected week.

Referring more particularly to FIG. 2, service definition 100 can begin when the employee logs in or connects to the server at 102. FIG. 2 can also indicate the FMI commands (in italics) that can be used to support the process flow for service definition 100, e.g., the connect IP Address command can be used to connect to the server at 102. Service definition 100 can then wait (104) for the mainframe system 12 to be ready to enter (106) the application name. The wait_for_msg command can continue to check, e.g., at 200 ms intervals, if, for the example of FIG. 2, "Application Name" is found, starting from position 409. The "@E" can signify the ENTER key to designate the end of the string. The command can return true when the designated string is found. This can ensure that the screen can be completely loaded before the next step can be executed. For the example of FIG. 2, the expected string variable can be "Application Name" and the value obtained can be "timereporting". The command can be configured to "time out" after a specified period, e.g., 10 seconds. Service definition 100 can send (108) the application name to mainframe system 12.

Upon obtaining the application name, service definition 100 can navigate (110) to a second screen. Service definition 100 can then wait (112) for the next screen to be fully loaded before entering (114) identification information. The associated FMI commands can operate similar to those for 104 and 106, with the employee inputting a name, and password, e.g., testuserid and testpassword. The "@T" can signify the TAB key for inputting multiple lines. Service definition 100 can navigate to a third screen if authentication is successful (118).

The third screen can be the main menu screen, and service definition 100 can wait (120) for the screen to be loaded and enter (122) a menu option, e.g., the employee can choose option 3 to view time reports for the designated week beginning with the date Jan. 1, 2002. The option choice can be sent to mainframe system 12 for execution at 124 and service definition 100 can wait (126) for mainframe system 12 to be loaded and to retrieve (128) the requested time reports. The retrieved results can be enclosed in a tag called, e.g., "timereported". Service definition 100 can terminate (130) the connection with the mainframe system 12 when the employee inputs a BREAK, e.g., "@C".

The service definition 100 of FIG. 2 can illustrate how the FMI commands can work together to interact with a mainframe system 12. It can be understood that, since Tcl is a script language, it can readily support branch, loop, and other browser flow controls in a service definition. For example, branching can be used to trap an error when the user enters invalid login parameters. In another example of a flow control, a loop can be used to separately retrieve time reported for each project in a listing of projects.

As noted, the exemplary service definition 100 of FIG. 2 can illustrate communication with mainframe system 12 so as to complete a service. To use interface 10 for Web communication, the client or user 14 can submit an extended mark-up language XML request. As known in the art, XML can have a hierarchical structure. The elements of the XML structure can be defined in the service definition. The root element of the request XML can be called "request." Attributes of the root can include the request name, user ID and password. The parameters element can be structured under the root and the parameters in the request can be referred to as the children of the parameter element.

The FMI commands can be used to read input XML. From Table 1, open_input_item, and close_input_item can be used to control the hierarchy of the XML string. By calling open_input_item with a tag name parameter element, the subsequent parameters can be the children of the tag name until the corresponding close_input_item for the tag name is executed. The get_parameter command can be used to get the value of a parameter from an element with the given tag name under the current element of the input XML. For example, in the sample scenario using known XML commands and conventions, the XML request may look like:

```
<request    name="get_time_report"    userid="test"
    password="test">
    <parameters>
        <login_info>
            <SSN>999-99-9999</SSN>
            <PWD>test_pwd</PWD>
        </login_info>
        <beginning_date>01012002</beginning_date>
    </parameters>
</request>
```

The previously described example of FIG. 2 hardcoded the values of ssn and pwd. The above XML commands can be used to retrieve ssn and pwd from the request XML. While the flow for service definition 100 can remain the same for Web communication, the associated FMI commands can be modified. For example, the send_key "testuserid" and send_key "testpassword" commands at 114 and the send_key "01012002" command at 122 of FIG. 2 can be replaced as follows:

| | |
|---|---|
| send_key "testuserid" → | open_input_item "login_info" |
| | send_key get_parameter "ssn" |
| send_key "testpassword" → | send_key get_parameter "pwd" |
| | close_input_item "login_info" |
| and send_key "01012002" → | send_key get_parameter "beginning_date". |

The open_input_item command can identify that subsequent operations between the open_input_item command and the close_input_item command can be children or part of the parameter having a tag name "login_info,". For the example above, this can include retrieving values for the parameters "ssn" and "pwd" from the input XML. The value for parameter "beginning_date" can be retrieved from the input XML under node "parameters". The send_key get_parameter "beginning_date" can be used to achieve this goal. The command can retrieve the value of beginning_date element in the input XML and can send the value to the current position of the mainframe screen.

The XML requests can have corresponding XML responses in return. A set of FMI commands can be defined to manipulate the output or response XML in a similar way as the input XML. FMI commands listed in Table 1 can be used for this purpose, including open_output_item, close_output_item, output, and retrieve_screen. Open_output_item and close_output_item can be counterparts of open_input_item and close_input_item discussed above. The output command can be used to write some contents into the response XML string. The retrieve_screen command can be used to retrieve information from the screen and add it to the response XML string. For example, in the sample scenario, the service request can generate the following response XML string:

```
<result>
    <timereported>
        <project_name>Interface</project_name>
        <total_hour>40</total_hour>
    </timereported>
</result>,
``` where Interface can be the name of the project for which time is reported and 40 can be the total time in hours reported for the project.

To generate this output, the following FMI commands can replace the retrieve_screen command at 128.

open_output_item "timereported"
retrieve_screen 320 60 "project_name"
retrieve_screen 380 20 "total_hour"
close_output_item "timereported"

The above example can illustrate how to retrieve values from input XML. In some scenarios, the user ID and password can be fixed for all XML requests and thus need not be provided by each individual input XML. Such information can be saved with the service definition as service parameters. When a service is defined, service parameters can be defined and stored in a database in an encrypted form, e.g., database 18 of interface 10 in FIG. 1. The FMI command get_service_parameter can be used to retrieve the value of a service parameter. In the exemplary scenario of FIG. 2, the user ID and password can be stored as service parameters, and the following two commands can retrieve the information from database 18 at 114 and send the information to the mainframe system 12 at 116.

send_key get_service_parameter "userid"
send_key get_service_parameter "password"

As shown in FIG. 1, interface 10 can include a communication module 20, an administrative module 22 and a tool module 24. The communication module 20 can provide connections to the client 14 and mainframe system 12 and can include interface engine 26, session manager 28, service processor 30, command processor 32, and host connector 34. The administrative module 22 can manage interface 10 and can include authenticator 36, admin tool 38, storage manager 40 and database 18. The tool module 24 can provide specialized tools to improve performance of interface 10, including logging service 42, message processor 44, connection pool 46, thread pool 48 and service cache 50.

Interface engine 26 can be configured as a lightweight connection listener. Upon receiving a connection request from client 14, interface engine 26 can create session manager 28 to handle subsequent requests associated with that connection. Once connected and authenticated, session manager 28 can act as a request listener and can expect requests from client 14. The requests can be administrative commands or service requests. An administrative command request can be used to manage interface 10, such as adding a user and/or updating a service definition. A service request can be used to execute a service and can contain the parameters to be used in executing the service. When a request message is received, session manager 28 can call the message processor 44 to parse the request. Message processor 44 can parse and validate incoming XML requests and can create an object used by session manager 28 to serve the request. Session manager 28 can then call service processor 30 or command processor 32 to execute service requests and administrative command requests, respectively.

Service processor 30 can process service requests, which can contain unique service IDs. Based on the service ID contained in a service request, the corresponding Tcl scripts associated with the service ID can be obtained from the service definitions in database 18, via storage manager 40, and can be executed by service processor 30. The host connector 34 can interact with the mainframe system 12 to execute the FMI commands in the Tcl script. The FMI commands can have corresponding APIs defined in host connector 34. Authenticator 36 can be used for authentication and entitlement of client 14. Authenticator 36 can check if client 14 is authorized to access interface 10. For service requests, Authenticator 36 can determine if client 14 is entitled to perform such a request based on the entitlement profile for client 14 that can be included in database 18. Only authorized clients can send administration command requests.

In the tools module 24, logging service 42 can log the major activities, warnings, and errors that occur on interface 10. Depending on the client system being used, fatal and error messages can also be sent to the client system's event logger. Logging service 42 can include tools to view and analyze the logs. Thread pool 48 can pre-create threads for processing service and command requests, so that the overhead of creating threads at runtime can be reduced. Rather than creating host connections at runtime, connection pool 46 can create some host connections when interface 10 is started. Service cache 50 can store the accessed service definitions in an in-memory cache to avoid frequent runtime database access.

The admin or administration tool 38 can maintain user access control and entitlement, create and modify service definitions, and conduct other administrative work. Once a service is defined using admin tool 38, storage manager 40 can divide the service definition into several Tcl scripts as discussed below. Storage manager 40 can also store and manage the data required by interface 10. In one embodiment, storage manager 40 can be designed to operate without a database management system (DBMS). Files can be used to store data as well. This embodiment can be beneficial when interface 10 has limited services and users. The data can be saved as files in the file system to minimize costs and overhead associated with DBMS operations.

Figure 3:
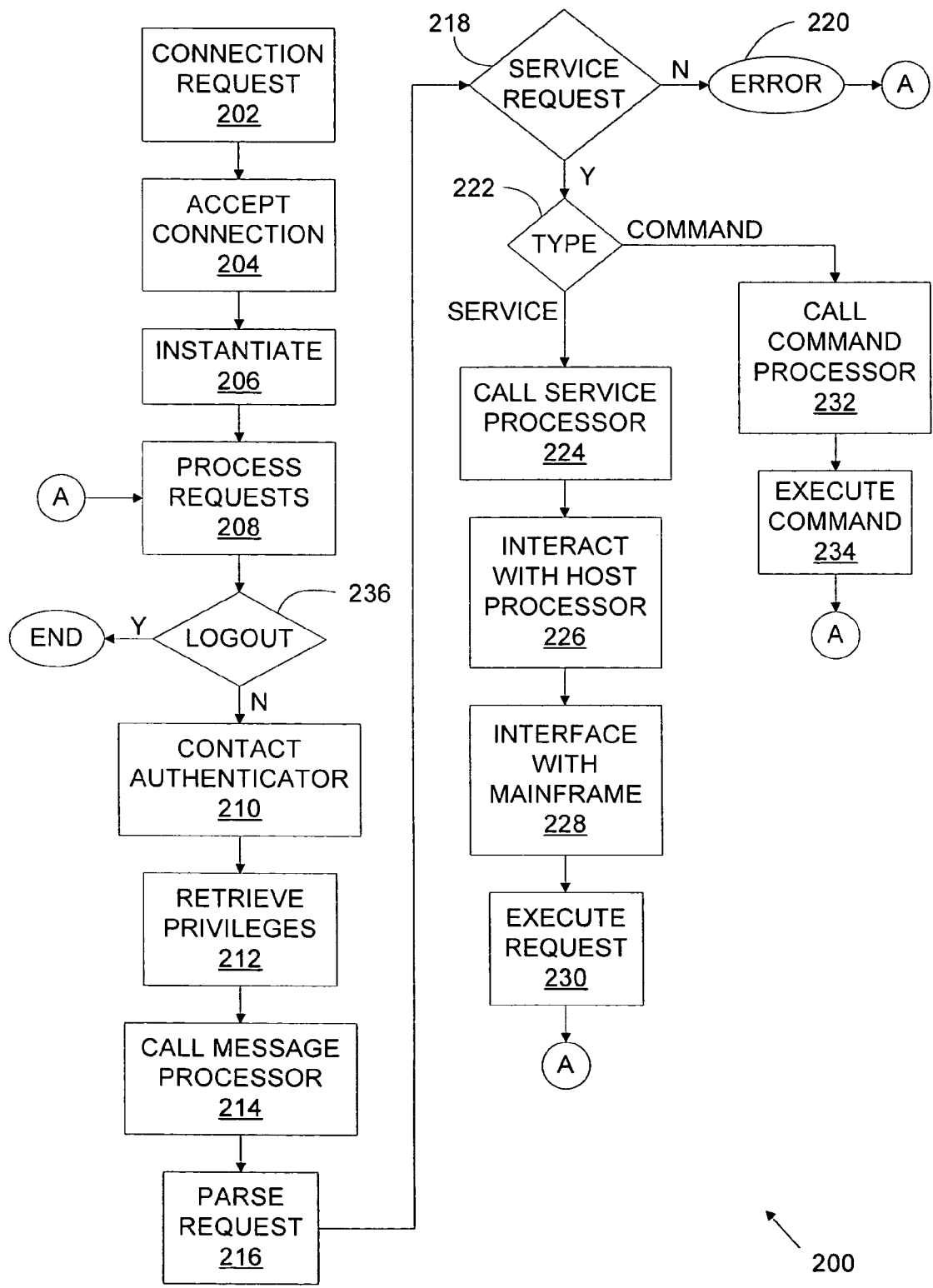
FIG. 3 illustrates a flow chart of a method of implementing the interface of FIG. 1.

FIG. 3 illustrates a typical procedure of serving a client connection. The illustrated procedure 200 can start with client 14 instantiating a connection request (202). In FIG. 1, the data flow from client 14 to interface 10 can be illustrated by data flow arrow 52. As an example, client 14 can initiate a request by accessing a web page with a browser. Upon receiving the connection request, interface engine 26 can accept the connection (204) and instantiate (206) a new session manager 28 to process the connection and process (208) new requests from client 14. The subsequent requests associated with the client 14 connection can be directed to session manager 28 directly. In FIG. 1, the instantiation of session manager 28 and subsequent communications between client 14 and session manager 28 can be illustrated by data flow arrows 54 and 56, respectively.

Session manager 28 first contacts (210) authenticator 36 to retrieve (212) the access privileges and/or entitlement information for client 14. Session manager 28 can call (214) message processor 44 to parse (216) the incoming request. Communications between communication module 20 and administrative module 22 and tool module 24 can be illustrated by data flow arrows 58 and 60 in FIG. 1, respectively. The entitlement information can be used to determine whether a request can be served (218). For example, the entitlement information for an employee can indicate that the employee can retrieve only time reports related to the employee's work. Based on this exemplary entitlement information, a request by the employee to retrieve another employee's time reports may not be served or processed.

An error message can be returned to client 14 when the entitlement information indicates the request cannot be served, as at 220, and procedure 200 can return to 208 to await further requests, as indicated at "A". If the request is to be served and the request is a service, as determined at 222, session manager 28 can call service processor 30 (224) to handle the service, as shown by data flow arrow 62 in FIG. 1.

Service processor 30 can interact (226) with host connector 34, as indicated by data flow arrow 64 in FIG. 1. Host connector 34 can in turn can interface (228) with mainframe system 12 to execute (230) the requested commands. Data flow arrow 66 of FIG. 1 can illustrate the connection between host connector 34 and mainframe system 12. If the request is a request for a single command, session manager 28 can call (232) command processor 32 to execute (234) the administrative commands, as illustrated by data flow arrow 68 of FIG. 1. Once execution of the service request at 230 or the command 234 is completed, including returning results to client 14, procedure 200 can return to await more requests, as indicated by "A" in FIG. 3. When the request is a logout request, as determined at 236, procedure 200 can end. Logging service 42 can be invoked during any stage of the process to log the key activities of interface 10.

It can be understood that in accepting a connection at 204 of FIG. 3, interface 10 can create a connection to mainframe system 12 for host connector 34 to interface with mainframe system 12. Such connections can be expensive to create. Interface 10 can provide a connection pool 46 to improve performance. When registering a service with interface 10, the number of connections in the pool 46 to be created can be specified. When interface 10 begins, the connections can be created and kept in connection pool 46. When a client 14 requests a connection, one of the pre-created connections can be assigned to client 14 (an instance of session manager 28, as at 206 of FIG. 3). If client 14 relinquishes control of the connection, e.g., at logout 236 of FIG. 3, the server can return the connection to the pool of available connections. During the lifetime of the connection while session manager 28 can be listening for requests, as at 208 of FIG. 3, the client can invoke any number of services using the reference to the connection. For example, an employee can request a benefits report after completing a time report request. Session manager 28 can obtain the reference to the connection from connection pool 46 when instantiated and can use this reference throughout its life span.

A screen navigation life cycle on mainframe system 12 can have at least three phases during screen scraping, including initialization, execution, and termination. For example, in the exemplary scenario of FIG. 2, the initialization phase can include login (102) through waiting for input at 112. The execution phase can include obtaining the input from the screen (114) through retrieving the time reported at 128. The termination phase can be illustrated at 130. It can be seen that the service definition 100 can be repeated from login 102 to termination 130 for each employee requesting time reports. It can also be observed that some navigation can remain the same for every request.

Figure 4:
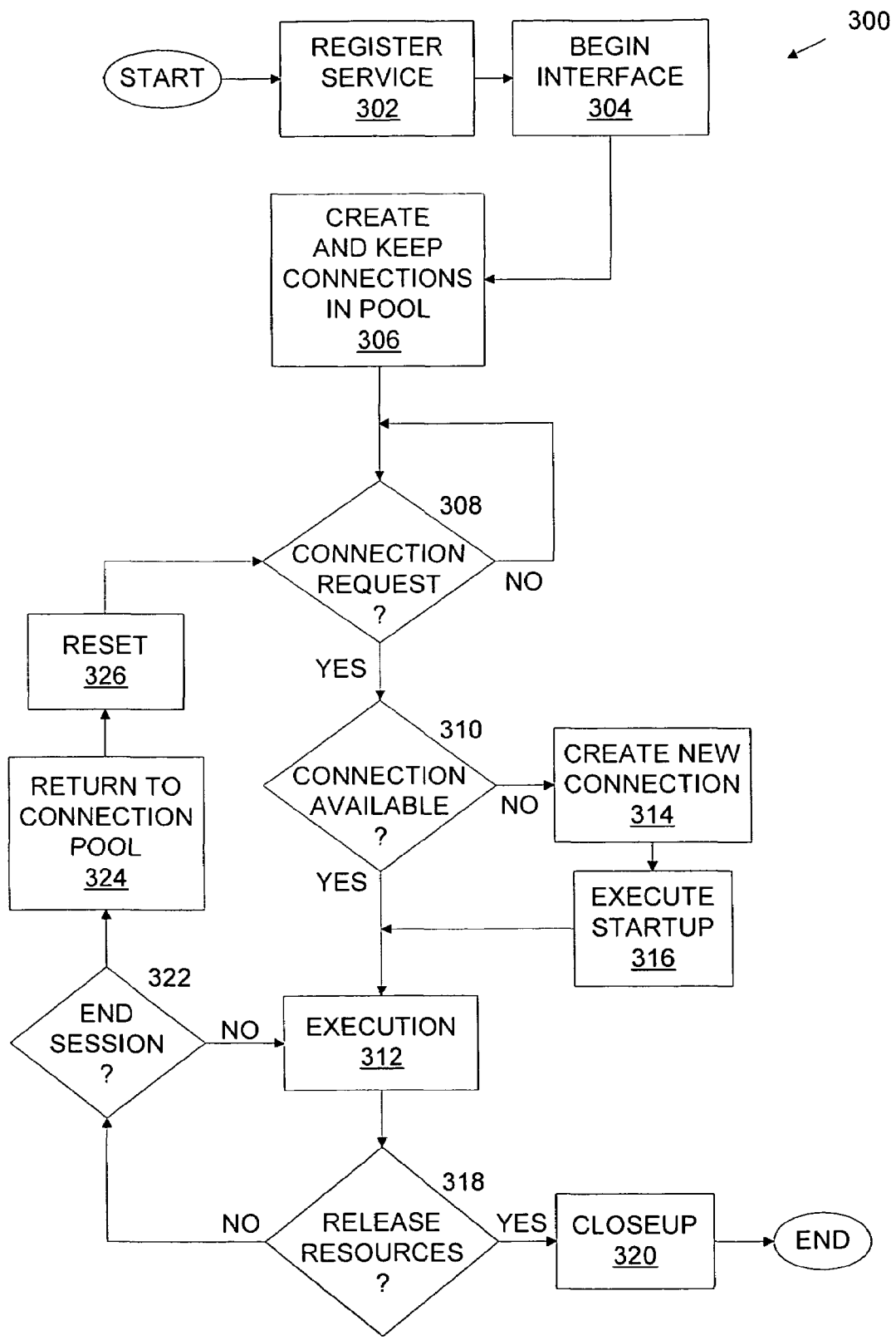
FIG. 4 illustrates a flow chart of a method for a screen navigation life cycle.

By pre-navigating these screens for each connection in connection pool 46, overall response time for obtaining reports can be improved. Thus, interface 10 can divide a service definition into several sections, including a STARTUP section corresponding with the initialization phase described above, an EXECUTION system corresponding with the execution phase and a CLOSEUP section corresponding with the previously described termination phase. FIG. 4 illustrates a flow chart 300 for the screen navigation life cycle described above. The method 300 can start when a user at client 14, e.g., a system administrator or programmer, can register (302) a service with interface 10 and can specify, as part of the registration, the number of connections in the pool 46 to be created, as previously described. When interface 10 begins (304), the connections can be created and kept in connection pool 46, as at 306. The number of connections in the connection pool can be changed dynamically by changing the connection pool number associated with a service, e.g., through administrative tool 38, or web-based administrative tool 72.

In creating the connections at 306, the STARTUP section can execute to pre-navigate the screens, using the login information provided by the client/administrator/programmer registering the service definition. In terms of a service definition, those commands before the first variable in the service definition can be put in the STARTUP section. This can ensure that the STARTUP section can be independent of the service requests, which can provide values for variables. When a connection request is received at runtime, as determined at 308, the method 300 can determine at 310 if a connection is available from connection pool 46. If a connection is available, the service definition can directly execute the EXECUTION section (312) as the STARTUP section can have been executed when the connection was created at 306. If a connection is not available, a new connection can be created (314) and the STARTUP section can be processed (316).

The EXECUTION section can be executed regardless of whether the connection is obtained from connection pool 46. The EXECUTION section can begin at the end of the STARTUP section, and can begin with the first request or command containing a variable. For example, in FIG. 2, the variables "testuserid" and "testpassword" can be entered at 114 and the EXECUTION section for service definition 100 would begin at 114. The separation of STARTUP from EXECUTION can significantly improve performance when connections are available in connection pool 46.

The CLOSEUP section can release the connection resources. It can specify the process to quit from mainframe system 12 and release the connection resources. At runtime, after completing the servicing of a request, as by executing the EXECUTION section, interface 10 can determine at 318 whether to release the connection resources in the CLOSEUP section (320). The determination can be based on whether the logout associated with the service definition is input, e.g., the termination sequence "send_key '@c'—close" at 130 of FIG. 2. Release of the connection resources, as by execution of the CLOSEUP section at 320, can end screen navigation life cycle 300.

When a client completes execution at 312 and the resources are not released, the client can choose at 322 to execute additional requests, or end the session. If the client chooses to end the session, the connection can be returned to the connection pool 46 (324). It can be understood that the service definition can include a RESET section that can bring the connection to the last page that STARTUP navigates to. The RESET section can be added to the service definition when registering the definition. In returning a connection to connection pool 46, the RESET section can be executed (326) and the screen navigation life cycle 300 can await further connection requests.

As previously described, when a connection to interface 10 is established, interface engine 26 can create a new thread, or session manager 28 to process requests for that connection. The session manager 28 can wait for incoming requests and when received, can parse the request by invoking message processor 44. After parsing, the incoming parameters can be stored in a hash table. The key and content for the hash table can be the variable name and value respectively. Session manager 28 can invoke command processor 32 and service processor 30 to process administrative commands and service requests, respectively, using the hash table as a parameter.

One purpose of service processor 30 can include managing the life cycle of a service. Interface 10 can include scripts corresponding to each section of a service definition, as described previously. Service processor 30 can obtain a connection for the service either from connection pool 46 or by creating a new connection. Each connection can include an instance of host connector 34. For a connection from connection pool 46, the EXECUTION section can be executed. For a newly created connection, the STARTUP section can be first executed using the host connector 34 instance and the parameter hash table, then the EXECUTION section can be executed. After EXECUTION, service processor 30 can create a new thread to return the final result to the requestor. Meanwhile, the main thread can invoke the RESET or CLOSEUP section depending on how the connection is to be released.

Host connector 34 can interface with mainframe system 12 through FMI commands. Implementation of the FMI commands can utilize a screen scraping software development kit (SDK). In one embodiment, the SDK can implement a high level language API for screen scraping. A connection can be allocated to serve each connection request and can include a reference to host connector 34, which can use the underlying screen scraping tool to maintain the state of screen navigation. When a Tcl script is executed by JACL, the reference to host connector 34 can be passed to JACL as a parameter, and FMI commands in the script can use the same connection to interface with mainframe system 12.

Host connector 34 can remember responses or error messages for the connection. In the life cycle of a connection, there can be multiple steps that retrieve information from mainframe system 12. The retrieved information can be stored in a buffer associated with the connection and error messages can be stored in a separate buffer. The contents of the buffers can be retrieved and returned to the clients.

In one embodiment, an administrator 70 can utilize a Web-based administrative tool 72 to manage interface 10. Using tool 72, administrator 70 can manage services and the mainframe servers with which interface 10 can communicate, including controlling access to clients, viewing logs, and configuring properties. As shown in FIG. 1, tool 72 can be bundled separately from interface 10 and can talk to interface 10 using XML requests/responses over a socket connection.

Administrative tool 72 can also include a Service Definition Development (SDD) toolkit 74 that developers can utilize to generate a skeleton of a service definition by specifying the identifiers of each screen and the actions to be taken in that screen. Developers can then modify the generated script to add other logic for further screen scraping manipulation. Developers can also trace and debug the execution of a service definition using the SDD toolkit 74 and the logs created by logging service 42.

As described herein, interface 10 can provide a generic framework to interface with mainframe systems and to automate interactions therewith using a client-interface-mainframe three-tier architecture. The interface 10 can provide major benefits over existing solutions in the industry including separation of the navigation flow from the front-end e-commerce applications. The client programs need only submit an XML service request to interface 10, without being concerned with how interface 10 and the mainframe system 12 work. Interface 10 also supports adding and/or updating services during operation of interface 10 to satisfy changing demands. As an example, changes to the screen flow of the time reporting system described previously can be accomplished by updating the service definition using the Admin Tool 38 without interrupting the functioning of interface 10. Interface 10 can also provide a quick mainframe interface development tool, with limited development effort needed to add or update an interface. Using connection pooling and connection life cycle control, interface 10 can provide good response time to client requests. These techniques and multi-threading implementation can help interface 10 to provide high scalability as well. Additionally, a Web-based administration tool can provide for ease in managing the interface 10 framework.

The systems and implementations thereof described herein may not be limited to particular components or configurations. For example, interface 10 can include multiple databases for separate storage of service definitions, access privileges, service parameters and other interface 10 information and/or data. The command processor and service processor can be combined into a single processing unit that can include processing for other components of interface 10. Interface 10 can include processors, volatile memory and non-volatile memory for storing request data, client data and other data corresponding to input and output values and other intermediate computations for the methods 100 and 200. The memory can include instructions for implementing interface 10, including implementation of procedure 200 and execution of service definitions such as service definition 100. Such instructions can be transferred, in the course of operation, from the non-volatile memory to the volatile memory and to the processor for execution.

Additionally, the flow chart in FIG. 2 can illustrate an exemplary service definition 100 for interface 10 and the flow chart of FIG. 3 can illustrate an exemplary implementation of interface 10. Other configurations can be contemplated and/or other actions, decisions, menus and the like can be included. For example, the branching and looping described with relation to FIG. 2 can provide additional functionality for service definitions.

In one embodiment, the core components of interface 10 can be developed using Java. The Java programming language developed by Sun Microsystems, Inc. has gained wide acceptance for writing software for the Internet and World Wide Web. While compilers for most programming languages generate code for a particular operating environment, Java enables writing programs using a "write once, run anywhere" paradigm. ("Write Once, Run Anywhere" is a trademark of Sun Microsystems, Inc.) The terminology used herein to describe aspects of interface 10 can include terminology associated with Java and JACL. In addition, the interface 10 can be implemented in .NET, a set of connection software technologies by Microsoft Corporation.

The systems and methods described herein may not be limited to a particular hardware or software configuration; they may find applicability in many computing or processing environments. They can be implemented in hardware or software, or a combination thereof. Preferably, the interface 10, service definitions such as service definition 100 and procedure 200 can be implemented in computer programs running in one or more processors. Implementation languages for the computer programs can include high level procedural languages, object oriented programming languages, assembly and/or machine language for communication with a computer system.

The computer programs can be stored on a storage media and/or one or more devices (e.g., CD-ROM, hard disk, or magnetic disk) that are readable by a general or special purpose programmable computer for configuring and operating the computer when the storage medium or device is read by the computer to perform the procedures described herein. The system and methods can also be considered to be implemented as a computer-readable storage medium, configured with a computer program, where the storage medium so configured can cause a computer to operate in a specific and predefined manner.

While the methods and systems have been disclosed in connection with the preferred embodiments shown and described in detail, various modifications and improvements thereon will become readily apparent to those skilled in the art. Those with ordinary skill in the art will recognize that the arrangement and connectivity of the components shown in the figures are merely for illustrative purposes, and can be varied accordingly and components may be combined or otherwise reconfigured without departing from the scope of the disclosed systems and methods.

Accordingly, many additional changes in the details and arrangement of parts, herein described and illustrated, can be made by those skilled in the art. It will thus be understood that the following claims are not to be limited to the embodiments disclosed herein, can include practices otherwise than specifically described, and are to be interpreted as broadly as allowed under the law.

What is claimed is:

1. A method, comprising:

receiving, at a computer device, requests for services from a client, where receiving the requests for the services comprises:

receiving a connection request from the client,
pre-establishing a plurality of session managers, and
instantiating a session manager to receive the requests for the services, where an interface engine in the computer device listens for the connection request and instantiates the session manager to receive the requests for services related to the connection request, and where instantiating comprises instantiating one of said plurality of session managers;
parsing, via the computer device, said requests to obtain parsed requests;
obtaining, via the computer device, service definitions based on said parsed requests;
executing, via the computer device, commands based on said service definitions, said commands corresponding with applications recognized by a mainframe system, said commands providing results to said requests for the services;
creating, via the computer device, a plurality of connections with the mainframe system to form a connection pool;
removing, via the computer device, one of the plurality of connections from the connection pool;
assigning, via the computer device, the one of the plurality of connections to interact with the mainframe system when one of the requests for services is received;
returning, via the computer device, the one of the connections to the connection pool when the client chooses to end a session with the mainframe system; and
providing, via the computer device, said results to said client.

2. A method according to claim 1, comprising:
retrieving entitlement information related to said client,
where obtaining said service definitions is in response to a determination that said entitlement information indicates that the computer device is permitted to process said parsed requests for said client.

3. A method according to claim 2, comprising:
returning an error message to said client when said entitlement information indicates that the computer device is not permitted to process said parsed requests for said client.

4. A method according to claim 1, where:
obtaining service definitions comprises determining that said requests for the services are requests for single commands; and
when said requests for the services are the requests for the single commands, executing the commands for providing the results comprises executing said single commands at an interface to interface said client with said mainframe system.

5. A method according to claim 1, where:
creating said plurality of connections comprises performing commands corresponding to startup sections of said service definitions; and
executing commands comprises performing commands corresponding to execution sections of said service definitions.

6. A method according to claim 5, where executing commands comprises performing commands corresponding to a close-up section of one of said service definitions to release said plurality of connections when said requests for services include a logout request.

7. A method according to claim 1, comprising:
specifying identifiers for screens of said mainframe system; and
specifying actions to be taken with respect to said screens to generate said service definitions, said actions including one of:
receiving said requests for services, and
providing said results.

8. A method according to claim 1, comprising:
opening a socket connection to an interface to facilitate interfacing with said mainframe system; and
managing said interface over said socket connection.

9. A method according to claim 8, where managing comprises at least one of:
controlling access of said clients to said interface,
generating said service definitions, and
modifying said service definitions.

10. A method according to claim 8, where managing comprises:
logging activities of said interface to obtain logs; and
debugging executing commands based on said logs.

11. An interface device, comprising:
a session manager to receive requests for services from a client;
a message processor to parse said requests to obtain parsed requests;
a service processor to obtain service definitions based on said parsed requests;
a host connector to:
interact with a mainframe system and to execute commands based on said service definitions, said commands corresponding with applications recognized by said mainframe system for providing results to said requests for services, and
provide the results to the client;
an interface engine to listen for a connection request and instantiate the session manager to receive the requests for services related to the connection request;
a thread pool of pre-established session managers, the interface engine to instantiate the session manager from one of the pre-established session managers from the thread pool, and
a connection pool including a plurality of connections between the host connector and the mainframe system, where the interface engine is further to:
removing one of the plurality of connections from the connection pool,
assigning the one of the plurality of connections to interact with the mainframe system when one of the requests for services is received, and
returning the one of the connections to the connection pool when the client chooses to end a session with the mainframe system.

12. An interface device according to claim 11, comprising:
a database to store a plurality of service definitions; and
a storage manager to:
communicate with said service processor, and
retrieve, from said database, said service definitions based on said parsed requests.

13. An interface device according to claim 11, comprising:
a cache memory; and
a service cache to store, in said cache memory, said service definitions for said requests for services related to said connection.

14. An interface device according to claim 11, comprising an administrative tool to facilitate at least one of:
creating new service definitions, and
modifying existing service definitions.

15. An interface device according to claim 14, where said administrative tool comprises a socket connection to communicate administrative requests to said interface device.

16. An interface device according to claim 11, comprising a command processor to execute administrative commands based on said requests for services when said requests for services are requests for a single command.

17. An interface device according to claim 11, comprising:
an authenticator containing access privilege information for said client, said access privilege information to determine if said service processor is authorized to obtain said service definitions based on said parsed requests for said client.

18. An interface device according to claim 11, comprising a logging service to log activities of said interface device.

19. A computer-readable storage medium encoded with instructions executable by a network device, the instructions to cause a processor in the network device to implement a method comprising:
receiving requests for services from a client, where receiving said requests for the services comprises:
receiving a connection request from said client,
pre-establishing a plurality of session managers, and
instantiating a session manager to receive said requests for the services, where an interface engine in the computer device listens for the connection request and instantiates the session manager to receive the requests for services related to the connection request, and where instantiating comprises instantiating one of said plurality of session managers;
parsing said requests to obtain parsed requests;
obtaining service definitions based on said parsed requests;
executing commands based on said service definitions, said commands corresponding with applications recognized by a mainframe system, said commands providing results to said requests for the services;
creating, via the computer device, a Plurality of connections with the mainframe system to form a connection pool;
removing, via the computer device, one of the plurality of connections from the connection pool;
assigning, via the computer device, the one of the plurality of connections to interact with the mainframe system when one of the requests for services is received; returning, via the computer device, the one of the connections to the connection pool when the client chooses to end a session with the mainframe system; and
providing said results to said client.

20. The computer-readable storage medium of claim 19, where:
creating said plurality of connections comprises performing commands corresponding to startup sections of said service definitions; and
executing commands comprises performing commands corresponding to execution sections of said service definitions.

21. The computer-readable storage medium of claim 20, where executing commands includes:
performing commands corresponding to a close-up section of one of said service definitions to release said plurality of connections when said requests for services include a logout request.

* * * * *